(12) United States Patent
Yokoyama et al.

(10) Patent No.: US 6,964,461 B2
(45) Date of Patent: Nov. 15, 2005

(54) BRAKE CONTROL APPARATUS (75) Inventors: Takahisa Yokoyama, Anjo (JP); Haruo Arakawa, Toyota (JP); Takayuki Takeshita, Anjo (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/899,059

(22) Filed: Jul. 27, 2004

(65) Prior Publication Data

US 2005/0040700 A1    Feb. 24, 2005

(30) Foreign Application Priority Data

Aug. 21, 2003  (JP) .............................. 2003-297461

(51) Int. Cl.[7] .............................................. B60T 13/66
(52) U.S. Cl. ..................... 303/155; 303/20; 303/113.4; 303/177; 188/162
(58) Field of Search ....................... 303/155, 20, 113.4, 303/3, 177; 701/80, 90; 188/158, 162, 181 A, 188/72.1

(56) References Cited

U.S. PATENT DOCUMENTS

2004/0222695 A1 * 11/2004 Miyazaki .................... 303/155

FOREIGN PATENT DOCUMENTS

| GB | 2336413 | * 10/1999 |
| JP | A-11-291894 | 10/1999 |
| JP | A-2000-203402 | 7/2000 |

* cited by examiner

Primary Examiner—Douglas C. Butler
(74) Attorney, Agent, or Firm—Posz Law Group, PLC (57) ABSTRACT

The brake control apparatus sets a target deceleration (1) in accordance with an amount of operation of the brake pedal. It calculates another target deceleration (2) on the basis of the target deceleration (1). In this calculation, limit values of deceleration increasing and decreasing gradients with respect to the target deceleration (1) are set on the basis of the target deceleration (1), and then the target deceleration (2) is obtained by correcting the target deceleration (1) on the basis of the established deceleration increasing and decreasing gradients. Accordingly, the deceleration increasing/decreasing gradient becomes small when braking is gentle. This makes it possible to curb an abrupt change in brake force to achieve smooth brake control. Further, the deceleration increasing/decreasing gradient becomes larger when braking is abrupt. Accordingly, it is possible to create a great change in brake force to provide a high response.

18 Claims, 6 Drawing Sheets

BRAKE CONTROL APPARATUS

CROSS REFERENCE TO RELATED APPLICATION

This application is based upon and claims the benefit of Japanese Patent Application No. 2003-297461 filed on Aug. 21, 2003, the content of which are incorporated herein by reference.

FIELD OF THE INVENTION

The present invention relates to a brake control apparatus for electrically controlling brake pressure in accordance with an amount of operation of a brake pedal.

BACKGROUND OF THE INVENTION

In some conventional brake control apparatuses equipped with a brake-pressure generator for producing a brake force and a pedal-reaction-force generator for producing a pedal reaction force in accordance with the pedal stroke, hysteresis is incorporated in the characteristics of the brake-pressure generator and the characteristics of the pedal-reaction-force generator. By means of such incorporation of hysteresis, the brake force corresponding to the amount of operation of the brake pedal is changed in the direction of applying the brake and in the direction of releasing the brake. Accordingly, brake-pedal sensitivity is reduced to stabilize deceleration, enabling smooth brake operation (see Japanese Patent Application Laid-open No. HEI 11-291894, for example).

Further, one of the proposed brake control apparatuses is capable of shortening the delay in the braking effect in response to abrupt braking by means of the detection of whether or not the brake pedal is abruptly pressed on the basis of a detection signal of a pedal stroke sensor (see Japanese Patent Application Laid-open No. 2000-203402, for example). In this apparatus, when the brake pedal is not abruptly pressed, a target brake force is calculated on the basis of a smoothed value of the detected values of the pedal stroke sensor. When the brake pedal is pressed abruptly, a target brake force is calculated without smoothing the detected values of the pedal stroke sensor. More specifically, the apparatus uses a low-pass filter for averaging the detected values of the pedal stroke sensor when the brake pedal is not pressed abruptly, and turns the low-pass filter off so as not to average the detected values when the brake pedal is pressed abruptly.

However, in the apparatus disclosed in the above Japanese patent HEI 11-291894, although different hystereses are provided for the brake force in the direction of applying the brake and the brake force in the direction of releasing the brake, a brake force is produced with an increasing/decreasing gradient that is determined from a stroke-to-reaction plot for the brake pedal. For this reason, when increasing/decreasing the brake force, a brake force sensitively responsive to the pedal stroke is produced, and thus it is impossible to offer a smooth braking feeling.

Further, in the apparatus disclosed in the above Japanese Patent No. 2000-203402, the low-pass filter is turned off only when the pedal is abruptly pressed. This switching causes the driver to feel uncomfortable. Further, because the determination of whether or not braking is abrupt is based only on the gradient of the pressure applied by depressing the brake pedal. Thus, if pressurization is abrupt, no matter how small the amount of the change in the pressurization is, this leads to abrupt braking. This similarly causes the driver to feel uncomfortable.

SUMMARY OF THE INVENTION

It is therefore an object of the present invention to provide a brake control apparatus which is capable of preventing a driver from feeling uncomfortable with braking and of offering a smooth braking feeling.

In a first aspect of the present invention, based on a first target deceleration determined in accordance with the amount of operation of a brake operating member, limit values of deceleration increasing and decreasing gradients with respect to the first target deceleration are set. Based on the limit values, a second target deceleration is obtained by correcting the first target deceleration. Accordingly, the deceleration increasing/decreasing gradient becomes small when braking is gentle. This makes it possible to lessen the sharp change in brake force to allow smooth brake control. Further, the deceleration increasing/decreasing gradient becomes large when braking is abrupt. This makes it possible to increase the change in the brake force to provide a high response.

For example, based on the difference between the first target deceleration and the second target deceleration, deceleration increasing and decreasing gradients are set. In this case, for example, as the absolute value of the difference between the first target deceleration and the second target deceleration is greater, it is possible to set a greater deceleration increasing/decreasing gradient.

Further, the deceleration increasing and decreasing gradients alternatively are able to be set also by feedback the magnitude of the second target deceleration. In this case, for example, with a greater second target deceleration, it is possible to set a greater deceleration increasing/decreasing gradient.

Further, it is possible to establish deceleration increasing and decreasing gradients on the basis of a differential value of the first target deceleration. In this case, for example, as the absolute value of the differential value of the first target deceleration is greater, it is possible to set a greater deceleration increasing/decreasing gradient.

In a second aspect of the present invention, the amount of operation of the brake operating member is converted to a first value which is a parameter corresponding to the amount of operation of the brake operating member. Then, the limit values of the increasing and decreasing gradients on the first value are set. Thus, a second value is obtained by correcting the first value. In this manner, the same effects are obtained as those in the first aspect of the present invention.

For example, the first target deceleration is employed as the first value, and the second target deceleration is employed as the second value. Further, a first pressurizing force generated by an actuator may be employed as the first value, and a second pressurizing force may be employed as the second value.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings.

First Embodiment

Figure 1:
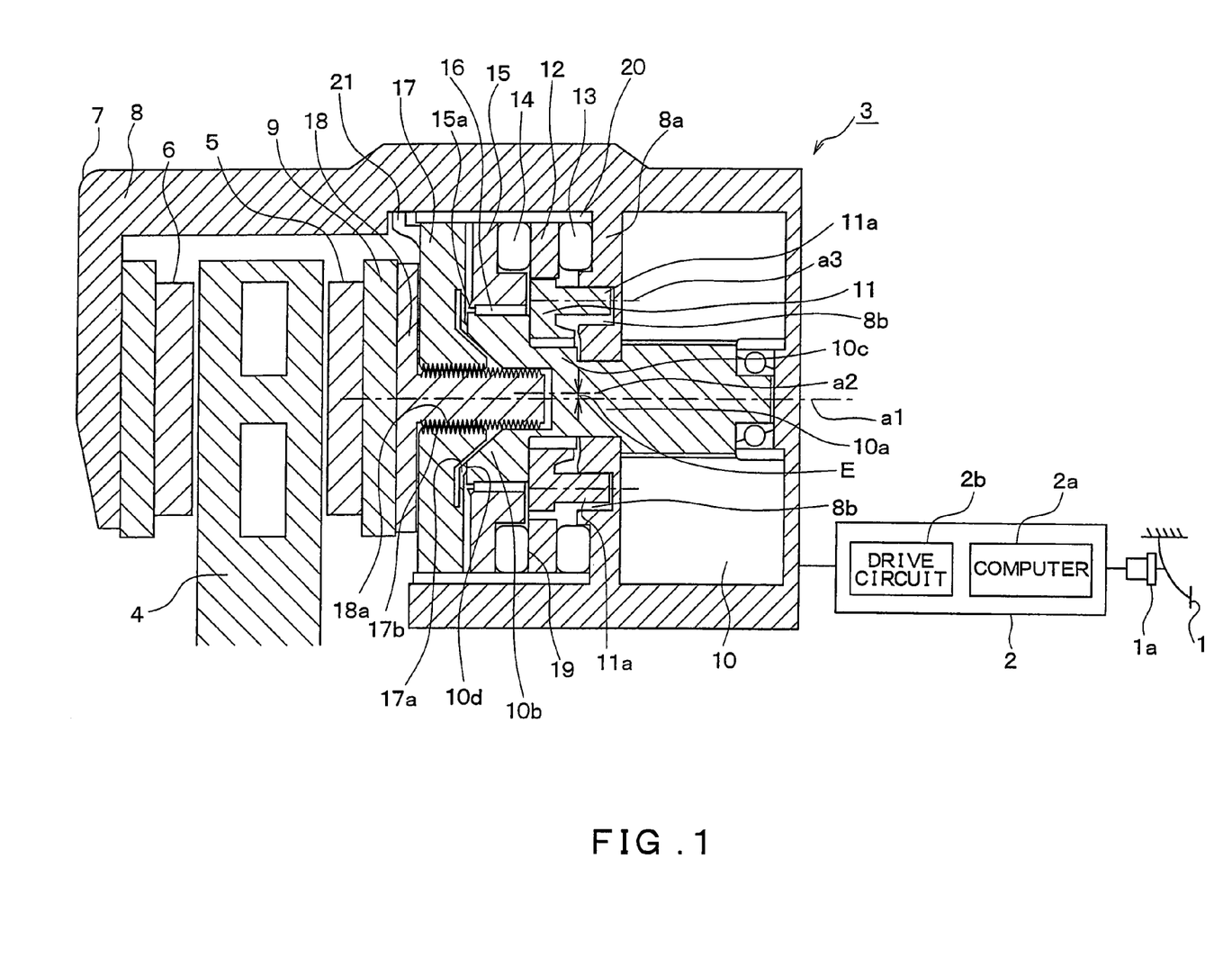
FIG. 1 is a schematic diagram illustrating a rough outline of the structure of an electric brake system in a first embodiment according to the present invention.

FIG. 1 illustrates a rough outline of the structure of an electric brake system to which an embodiment according to the present invention is applied. The structure of the electric brake system will be described below with reference to FIG. 1.

The electric brake system includes a brake pedal 1 corresponding to a brake operating member, an electronic control unit (hereinafter referred to as "ECU") 2, an electric brake 3 for generating a braking force on each wheel, and the like. The electric brakes 3 are mounted individually on the four wheels, but FIG. 1 representatively illustrates only the electric brake 3 mounted on one of the four wheels.

To the brake pedal 1, a pedal operating sensor 1a is attached for detecting the amount of operation of the brake pedal 1, e.g., the pedal depression force or the amount of stroke. A detection signal is sent from the pedal operating sensor 1a to the ECU 2.

The ECU 2 is equipped with a computer 2a, a drive circuit 2b and the like. The ECU 2 receives the detection signal from the pedal operating sensor 1a and uses the received detection signal to execute various types of operations. To be more specific, the ECU 2 uses the computer 2a to obtain a target brake force to be generated with the electric brake 3, that is, a target value for an instruction current in accordance with a target deceleration to be generated for the vehicle, and outputs the instruction current equivalent to the obtained target value from the drive circuit 2b for application to the electric brake 3.

Figure 2A:
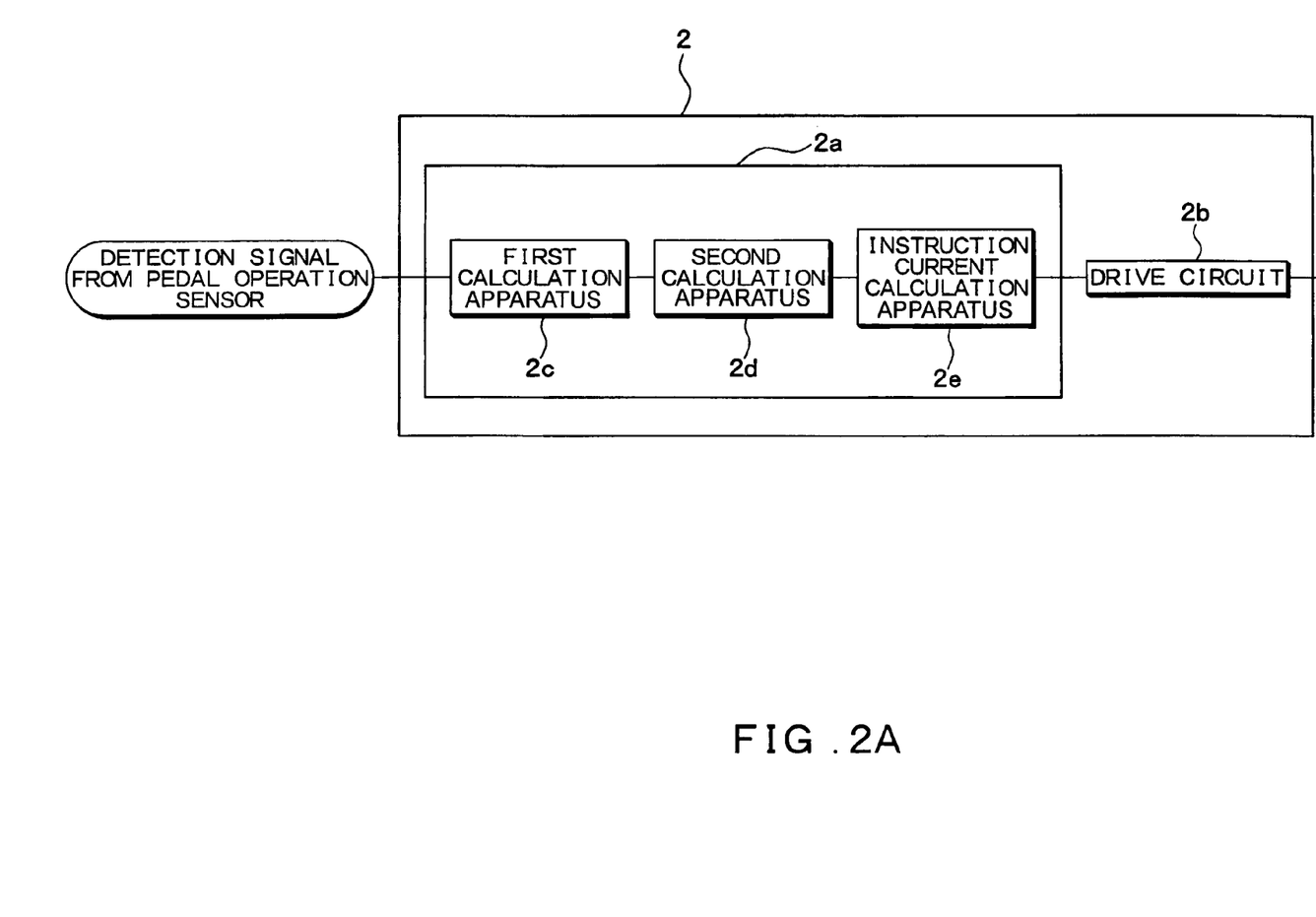
FIG. 2A is a block diagram illustrating an ECU 2.

FIG. 2A shows a block diagram of the computer 2a in the ECU 2. The structure and operation of the computer 2a is described in detail with reference to FIG. 2A.

As shown in FIG. 2A, the computer 2a includes a first calculation apparatus 2c, a second calculation apparatus 2d and an instruction-current calculation apparatus 2e.

Figure 2B:
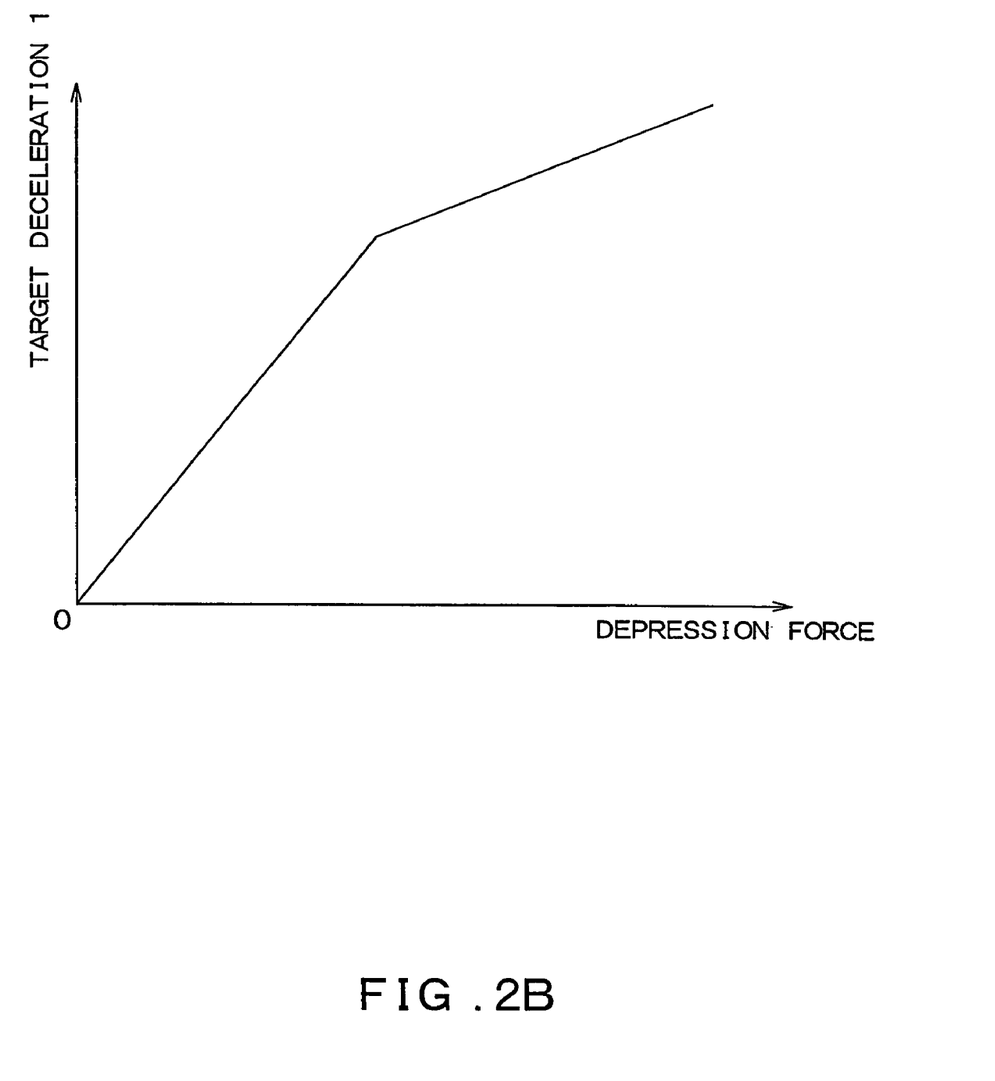
FIG. 2B is a graph showing the correlation between a pedal depression force and a target deceleration 1.

The first calculation apparatus 2c receives the detection signal from the pedal operating sensor 1a, and thereby calculating a target deceleration 1 on the basis of the amount of operation of the brake pedal 1. More specifically, the relationship between a pedal depression force and a deceleration with regard only to the static characteristics of the electric brake system is pre-obtained and mapped as shown in FIG. 2B. Hence, based on the map, a deceleration is selected corresponding to the pedal depression force obtained from the detection signal sent from the pedal operating sensor 1a.

Figure 2C:
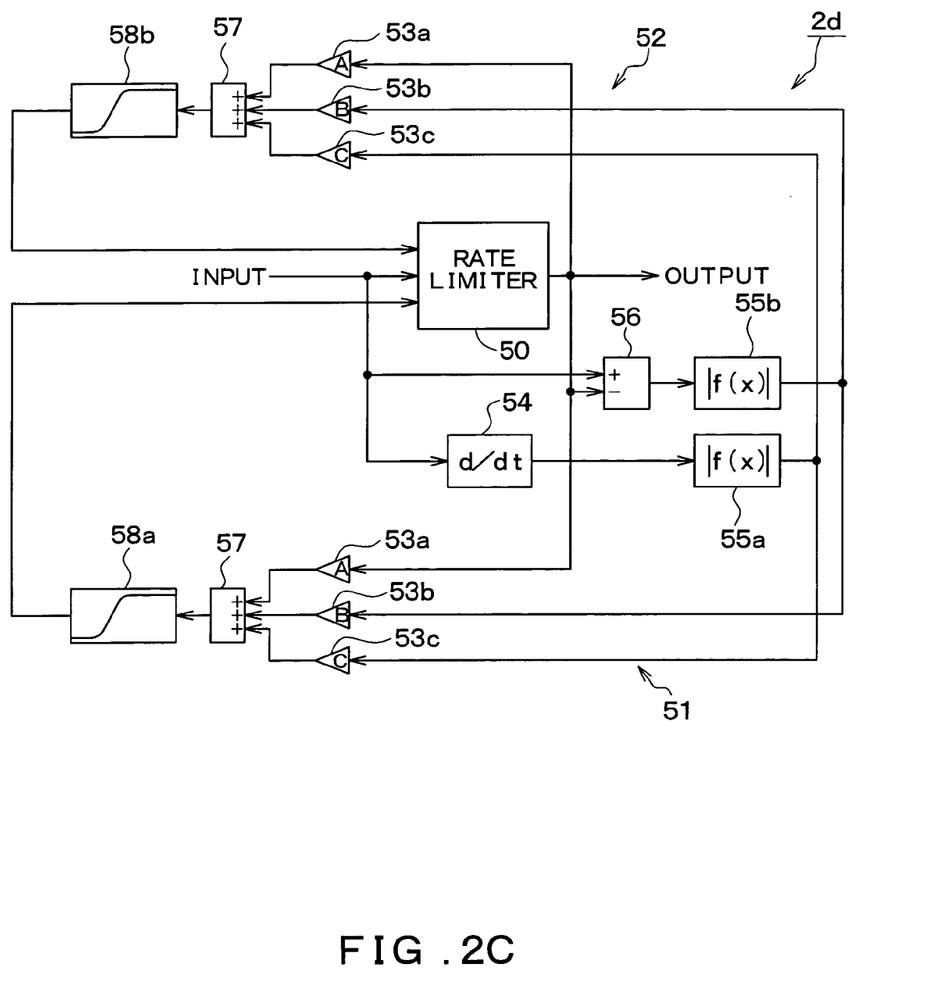
FIG. 2C is a block diagram of a second calculation apparatus.

The second calculation apparatus 2d receives a signal indicative of the target deceleration 1 from the first calculation apparatus 2c, and corrects the target deceleration 1 with regard to a driver's braking feeling to calculate a target deceleration 2. FIG. 2C shows a block diagram of the second calculation apparatus 2d in detail.

As shown in FIG. 2C, the second calculation apparatus 2d includes a rate limiter 50, a deceleration increasing-gradient setting portion 51 and a deceleration decreasing-gradient setting portion 52.

The rate limiter 50 receives a signal indicative of the target deceleration 1 and outputs a signal indicative of the target deceleration 2. The rate limiter 50 also receives signals indicative of the deceleration increasing gradient and the deceleration decreasing gradient which are set by the deceleration increasing-gradient setting portion 51 and the deceleration decreasing-gradient setting portion 52. The rate limiter 50 corrects the target deceleration 1 in accordance with the deceleration increasing gradient and the deceleration decreasing gradient to obtain the target deceleration 2.

Based on the output value of the rate limiter 50, the absolute value of the differential value of the input value and the absolute value of the difference between the input and the output, the deceleration increasing-gradient setting portion 51 and the deceleration decreasing-gradient setting portion 52 individually assign weights to those values to calculate the deceleration increasing gradient and the deceleration decreasing gradient.

The output value represents the magnitude itself of the target deceleration 2. For this reason, the output value is used for changing the response of the output to an input in accordance with the magnitude of the preset target deceleration 2. For example, based on this output value, the deceleration increasing/decreasing gradient is adjusted such that a moderate gradient is created when the target deceleration 2 is low, and a sharp gradient is created when it is high.

The differential value of the input value represents the amount of change in the target deceleration 1. Hence, the differential value of the input value is used for changing the response of the output to the input in accordance with the amount of change in depression of the brake pedal 1 by the driver. For example, when a great change in depression of the brake pedal 1 is produced to yield a large amount of change in the target deceleration 1, the deceleration increasing/decreasing gradient is adjusted at a sharp angle to allow the target deceleration 2 to be set with a good response.

The difference between the input and the output is provided with the aim of allowing compatibility between a good response and the braking feeling provided to the driver, and therefore is used for a change in response of the output to the input in accordance with the degree of separation between the input and the output. Hence, in the case of a large difference between the input and the output (i.e. a large degree of separation between the input and the output), the deceleration increasing and decreasing gradients are increased in order to significantly change the deceleration at this time. In contrast, in the case of a small difference between the input and the output (i.e. a small degree of separation between the input and the output), the deceleration increasing and decreasing gradients are lessened in order to prevent a great change in the deceleration at this time.

The output value from the rate limiter 50 is multiplied by A times by an amplifier 53a. Further, the input value to be fed into the rate limiter 50 is differentiated by a differentiator 54, then is converted to an absolute value by an absolute-value generator 55a, and then is multiplied by C times by another amplifier 53b. Further, a difference between the input value to and the output value from the rate limiter 50 is obtained by a difference generator 56, then is converted to an absolute value by the absolute-value generator 55b, and is then multiplied by B times by another amplifier 53c. Each of the "A", "B" and "C" defined herein is a constant, and is a value which is adjusted as appropriate in accordance with a braking feeling for the driver. For example, "A", "B" and "C" are set at a value ranging from −5 to +5, preferably, zero to 1.

Then, the output value from the rate limiter 50, the absolute value of the differential value of the input value thereto and the absolute value of the difference between the input and output values are multiplied respectively by the above predetermined gains to be assigned weights, and then are added together by an adder 57. Then, based on the results obtained respectively by the adders 57, a deceleration increasing-gradient setting map 58a and a deceleration decreasing-gradient setting map 58b are used to determine the deceleration increasing gradient and the deceleration decreasing gradient.

Figure 3:
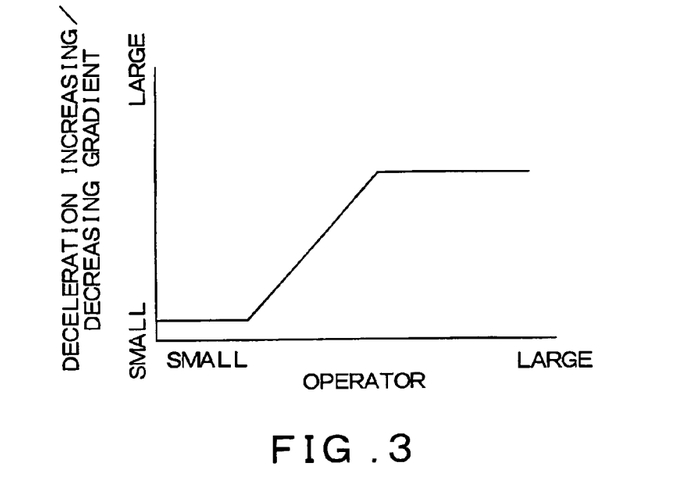
FIG. 3 is a graph showing the correlation between an operand and a deceleration increasing/decreasing gradient.

For example, an operand, "output value×A+|difference between input and output values|×(absolute value of difference between input and output values) ×B+|differential value of input value|×(absolute value of differential value of input value)×C", is defined, and thus the angle of the deceleration increasing gradient is set in accordance with the size of the operand as shown in FIG. 3. The correlation between the operand and the deceleration increasing gradient as shown in FIG. 3 is set as appropriate in accordance with the driver's braking feeling and the output limit of the motor. For example, the maximum value and the minimum value of the deceleration increasing gradient are set at 10 G/sec and 0.1 G/sec.

Further, the rate limiter 50 receives signals indicative of the deceleration increasing gradient and the deceleration decreasing gradient which have been determined in this manner. These deceleration increasing gradient and decreasing gradient are used as critical gradients to limit the increasing/decreasing gradient of the target deceleration 1. When the target deceleration 1 changes along any gradient exceeding the deceleration increasing/decreasing gradient, a corrected value not exceeding the deceleration increasing/decreasing gradient is output as the target deceleration 2 from the rate limiter 50, whereas when the target deceleration 1 changes along any gradient not exceeding the deceleration increasing/decreasing gradient, the value is output without change as the target deceleration 2 from the rate limiter 50. The target deceleration 2 which is the output from the rate limiter 50 serves as the output from the second calculation apparatus and is fed to the instruction-current calculation apparatus 2e.

Then, the instruction-current calculation apparatus 2e shown in FIG. 2A receives a signal indicative of the target deceleration 2 from the second calculation apparatus 2d, and calculates an instruction current corresponding to the target deceleration 2, that is, a current value to be applied to the electric brake 3 for obtaining the target deceleration 2. For example, how much braking torque on each wheel is required for producing a deceleration of 1 G is calculated from a friction coefficient μ of the brake pad, which will be described later, and the like. Then, how much pressurizing force is required by the electric brake 3 is determined, and then an instruction current corresponding to the result is calculated. The instruction current is calculated in the instruction-current calculation apparatus 2e in this manner, thereafter the signal indicative of the calculated instruction current is output to the drive circuit 2b, and then the instruction current is supplied from the drive circuit 2b to the electric brake 3.

The electric brake 3 is a disc brake and has a disc rotor 4 rotating in conjunction with the wheel, a pair of friction pads 5 and 6, that is, the first and second brake pads, which are placed on both sides of the disc rotor 4 so as to sandwich the disc rotor 4, and a caliper 7 which straddles the disc rotor 4 and holds the pair of friction pads 5 and 6. The caliper 7 is structured as follows.

A motor 10 having a rotating shaft 10a is secured inside a housing 8 forming the outside shape of the caliper 7. The housing 8 incorporates various components for pressing the first and second brake pads 5 and 6 onto the disc rotor 4.

An inner rotor 11 with an outer-tooth portion is secured on the rotating shaft 10a of the motor 10. An outer rotor 12 is placed around the inner rotor 11 and has an inner-tooth portion meshed with the outer-tooth portion of the inner rotor 11. Roller bearings 13 and 14 are placed on both faces of the outer rotor 12. A clutch release member 15 is placed so as to be adjacent to the roller bearing 14, and has a hole formed in a central portion thereof. A bearing 16 is provided between the interior wall face of the hole and the exterior circumferential face of the rotating shaft 10a of the motor 10. Incidentally, in the following, the direction of the axis center of the rotating shaft 10a of the motor 10 is referred to simply as "the axial direction", and the direction of rotation of the rotating shaft 10a is referred to as "the circumferential direction". Further the direction of movement from the motor 10 toward the disc rotor 4 is referred to as "the forward direction" and the reverse direction is referred to as "the backward direction".

On the disc rotor 4 side of a distal end portion 10b of the rotating shaft 10a of the motor 10, a female screw member 17 is placed and provided with a clutch member 17a which is in contact with the end face of the distal end portion 10b of the rotating shaft 10a. A female-screw hole 17b is formed in a central portion of the female screw member 17 a male screw 18a is screwed thereinto. The male screw 18a is formed as a part of a male screw member 18 provided for securing a friction-material holding portion 9 holding the first brake pad 5.

The rotating shaft 10a of the motor 10 rotates around an axis center a1. An eccentric rotation portion 10c is formed on the rotating shaft 10a and has an axis center a2 positioned away from the axis center a1 by the amount of eccentricity e.

The eccentric rotation portion 10c provided on the motor rotating shaft 10a; the inner rotor 11 rotated around the axis center a1 by the rotation of the eccentric rotation portion 10c; a pin hole 8b formed in a motor accommodating wall 8a of the housing 8; and the outer rotor 12 form a cyclo-speed-reducer mechanism.

In the cyclo-speed-reducer mechanism, the eccentric rotation portion 10c serving as an input shaft is rotated by applying electric power to the motor 10. At this time, inner pins 11a provided on the inner rotor 11 are restrained from moving by the pin hole 8b so as to move only within the pin hole 8b. Therefore, by the rotation of the eccentric rotation portion 10c, the axial center a3 of each inner pin 11a revolves inside the pin hole 8b and the inner rotor 11 revolves at an RPM around the axis center a2. The RPMs of the revolution of the inner pin 11a and the inner rotor 11 at this point is equivalent to the rotational speed of the motor 10.

The revolution of the inner rotor 11 is transmitted to the outer rotor 12. Then the outer rotor 12 rotates in the circumferential direction at a gear ratio which is determined on the basis of the number of teeth of the inner-tooth portion of the outer rotor 12 and the number of teeth of the outer-tooth portion of the inner rotor 11. At this point, because the outer rotor 12 is sandwiched between the roller bearings 13 and 14, the rotating position of the outer rotor 12 in the axial direction is fixed.

Further, a ramp portion 19, the roller bearing 14 and the clutch release member 15 form a ramp mechanism.

A plurality of ramp portions 19 are provided on the end face of the outer rotor 12 on the side of the bearing 14, and formed along the circumferential direction of the outer rotor 12 so as to be inclined at a predetermined angle with respect to the end face of the outer rotor 12, which is not shown in FIG. 1. Hence, when the ramp portion 19 rotates with the rotation of the outer rotor 12, the roller bearing 14 and the clutch release member 15 are urged toward the left side of the drawing of FIG. 1 by the inclination of the ramp portion 19.

The clutch release member 15 is formed of a ring-shaped member, the outer circumference of which is in contact with a bearing 20 and the inner circumference thereof is in contact via the bearing 16 with the end portion 10b of the motor rotating shaft 10a. Hence, in the circumferential direction and axial direction, the clutch release member 15 can slide inside the housing 8. However, the clutch release member 15 is positioned in contact with the roller bearing 14 on the face which is perpendicular to the axial direction, so as to be inhibited from moving toward the roller bearing 14. Further, the clutch release member 15 is provided with a circle shaped projection 15a on the face thereof opposite to the outer rotor 12. The projection 15a is placed in contact with the clutch member 17a provided on the female screw member 17 in the axial direction.

In the ramp mechanism structured in this manner, the rotation of the outer rotor 12 is transmitted via the roller bearing 14 to the clutch release member 15. Then, while the clutch release member 15 is out of contact with the female screw member 17 (clutch member 17a), the clutch release member 15 rotates integrally with the roller bearing 14 and the outer rotor 12 at the same speed in the circumferential direction.

Then, the projection 15a of the clutch release member 15 comes into contact with the female screw member 17 (clutch member 17a) and the restraining force acts on the clutch release member 15. Thereupon, a speed differential in rotational speed in the circumferential direction is produced between the clutch release member 15 and the outer rotor 12. Hence, the relative displacement between the clutch release member 15 and the outer rotor 12 in the axial direction is increased in accordance with the speed differential and the inclined angle of the ramp portion 19. Thus the clutch release member 15 moves towards the left in FIG. 1.

The female screw member 17 is able to rotate relatively with respect to the housing 8, and is provided with a plurality of clutch members 17a capable of coming in and out of contact with the shaft end portion 10b of the motor rotating shaft 10a.

The clutch members 17a are arranged in plurality in the circumferential direction, and each extends in the direction of the center of the female screw member 17. When the end portion of the clutch member 17a is in contact with the shaft end portion 10b at a contact portion 10d, the rotation of the motor rotating shaft 10a is transmitted to the female screw member 17 because of a friction force generated on the contact portion 10d, and thus the female screw member 17 rotates in the circumferential direction. Accordingly, because the male screw member 18 is inhibited from rotating in the circumferential direction, the male screw member 18 moves in the axial direction by the rotation of the female screw member 17, and presses the first brake pad 5 onto the disc rotor 4.

Note that, a one-way clutch 21 permitting the female screw member 17 to rotate only in one direction is provided on the outer circumferential portion of the female member 17, so as to engage with the housing 8. The one-way clutch 21 permits the rotation of the female screw member 17 in the direction that thrusts the first brake pad 5 and blocks the rotation thereof in the reverse direction. For this reason, when releasing the brake, the direction of rotation of the female screw member 17 is not reversed. Accordingly, even if wearing of the first brake pad 5 develops, it is possible to prevent the space between the first brake pad 5 and the disc rotor 4 from exceeding a predetermined value.

Further, the male screw member 18 is inhibited from moving in the circumferential direction and is capable of moving only in the axial direction. One end of the male screw member 18 is joined to the friction-material holding portion 9 holding the first brake pad 5, and at the other end thereof a male screw 18a is formed. The male screw 18a is located to engage with the female screw 17b of the female screw member 17, so that the axis thereof is aligned with the axis center a1 of the motor rotating shaft 10a.

With the electric brake 3 structured as described hitherto, when the instruction current determined by the ECU 2 is output from the drive circuit 2b, the motor 10 receives the instruction current and is driven. Accordingly, as the motor rotating shaft 10a is rotated, the male screw member 18 is urged toward the left side of the drawing of FIG. 1, to cause the first brake pad 5 to come into contact with the disc rotor 4.

Then, upon contact of the first brake pad 5 with the disc rotor 4, the male screw member 18 is incapable of moving any further toward the left side of the drawing, so that the entire caliper 7 is urged toward the right side of the drawing of FIG. 1 by the urging force of the male screw member 18 toward the left side of the drawing to bring the second brake pad 6 into contact with the disc rotor 4. In this manner, the disc rotor 4 is clamped between the first and second brake pads 5 and 6, and a friction force is applied to the disc rotor 4 so as to stop the rotation. Thus, the rotation of the wheel in conjunction with the disc rotor 4 is stopped, and a braking force is obtained by a friction force generated between the tire mounted on the wheel and the road surface.

Figure 4:
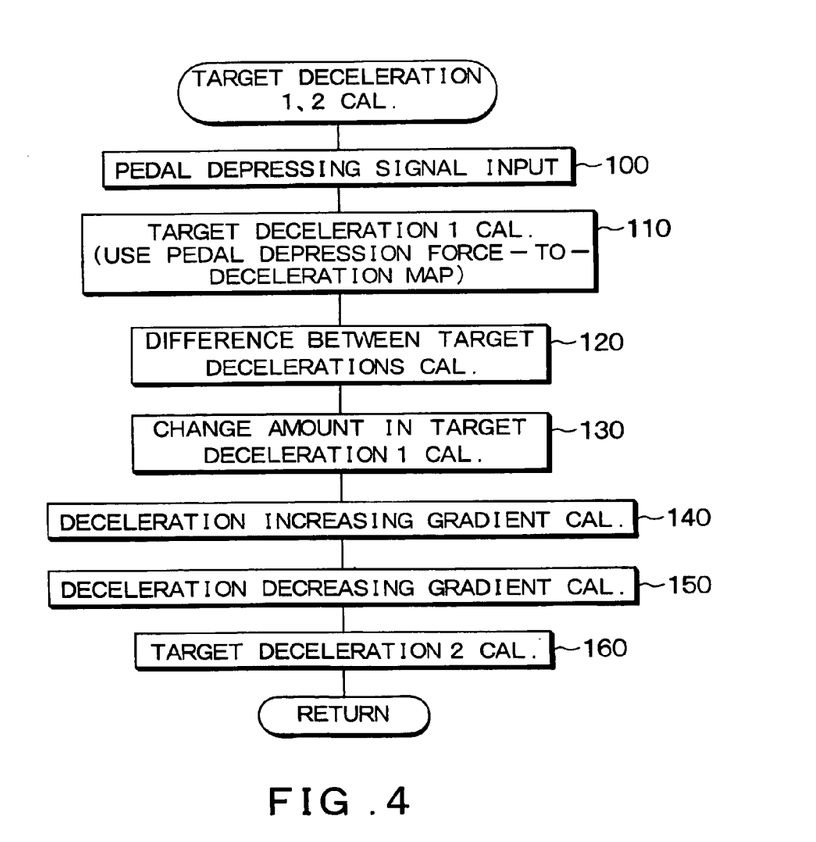
FIG. 4 is a flow chart of a processing for setting target decelerations 1 and 2.

In the foregoing electric brake system, the ECU 2 executes the processing of setting the target decelerations 1 and 2. The processing of setting the target decelerations 1 and 2 is shown in a flow chart in FIG. 4 and described with reference to FIG. 4. Note that the processing shown in FIG. 4 is initiated at the same time when the ignition switch (not shown) is turned on.

First, at 100, a pedal depressing signal is input and the amount of operation of the pedal is detected. Then, at 110, a target deceleration 1 is calculated on the basis of the amount of operation of the pedal, for example, the pedal depression force. This calculation is executed on the basis of the pedal depression force-to-deceleration map as shown in FIG. 2B.

Then, at 120, a difference between target decelerations is calculated. Specifically, an absolute value of the difference between the target deceleration 2 and the target deceleration 1 is calculated. Then, at 130, the amount of change in the target deceleration 1 is calculated. Specifically, the target deceleration 1 is differentiated and thus the amount of change in the target deceleration 1 per unit time is calculated.

Then, at 140 and 150, a limit to the deceleration increasing gradient and a limit to the deceleration decreasing gradient are calculated. Then, at 160, based on these calculated limits, a target deceleration 2 is obtained by correcting the target deceleration 1.

In this manner, the deceleration increasing and decreasing gradients are set in accordance with the driver's braking feeling, and then the target deceleration 2 is calculated. After that, the instruction current corresponding to the target deceleration 2 is applied to the motor 10 of the electric brake 3.

In the first embodiment, the deceleration increasing and decreasing gradients are set by the use of the rate limiter 50 having the second calculation apparatus 2d on the basis of an output value, an absolute value of a difference between input and output, and an absolute value of a differential value of an input value.

Figure 5A:
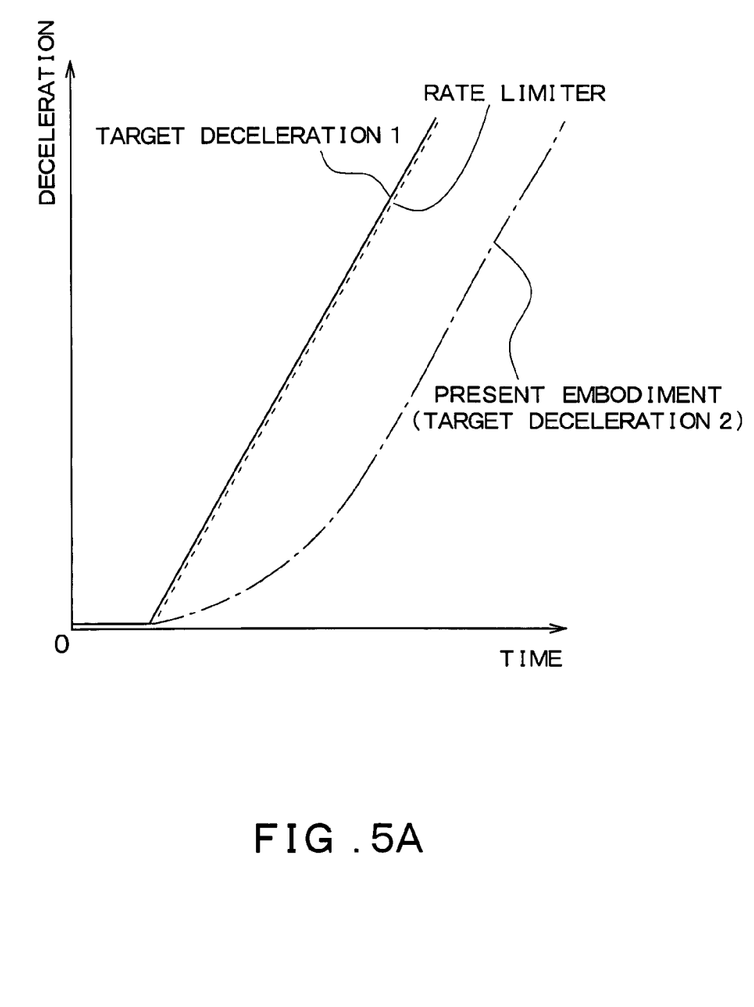
FIG. 5A is a timing chart illustrating the gradient of the target decelerations 1 and 2 when the degree of separation between the target deceleration 1 and the target deceleration 2 is low.
Figure 5B:
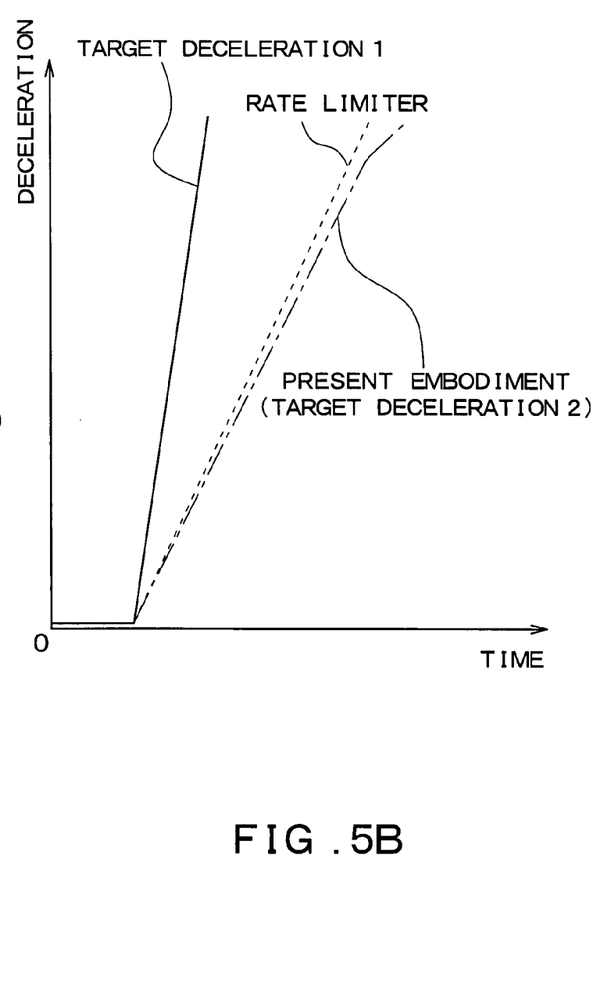
FIG. 5B is a timing chart illustrating the gradient of the target decelerations 1 and 2 when the degree of separation between the target deceleration 1 and the target deceleration 2 is high.

Then, for example, as shown in FIG. 5A, when the degree of separation between the target deceleration 1 and the target deceleration 2 is small, the deceleration increasing/decreasing gradient is set gently as if to extend horizontally. Further, as shown in FIG. 5B, when the degree of separation between the target deceleration 1 and the target deceleration 2 is large, the deceleration increasing/decreasing gradient is set sharply to produce a great change in the deceleration.

Hence, when braking is gentle, the deceleration increasing/decreasing gradient becomes small. This makes it possible to restrain a sudden change in brake force to allow smooth brake control. Further, when braking is abrupt, the deceleration increasing/decreasing gradient becomes large. This makes it possible to create a great change in brake force to provide a high response.

Accordingly, when the driver slightly moves the brake pedal 1, the deceleration increasing/decreasing gradient is lowered for a smooth increase/decrease in deceleration, leading to a satisfactory braking feeling. On the other hand, when the driver greatly moves the brake pedal 1, it is possible to raise the increasing/decreasing gradient to provide a high response capable of coping with an abrupt increase/decrease in deceleration. Accordingly, it is possible to achieve compatibility between a good response and satisfactory braking feeling.

Other Embodiments

In the first embodiment, the increasing and decreasing gradients of target deceleration are set. However, if the target deceleration which is determined in accordance with the amount of operation of the brake pedal 1 corresponding to the brake operating member is replaced with another parameter, and the increasing and decreasing gradients of the parameter are adjusted, this is substantially the same as the present invention. It is possible to implement the present invention by means of, for example, the use of a pressurizing force produced by the brake pad of the electric brake 3 as a parameter corresponding to the target deceleration, and the adjustment of the increasing and decreasing gradients of the pressurizing force. That is, it is also possible to employ the manner as follows: as in the case of the target deceleration and the pressurizing force, the amount of force applied to the brake operating member by the driver is converted to a first value which is the parameter corresponding to the amount of force applied to the brake operating member, then limit values of the increasing and decreasing gradient on the first value are obtained, and then a second value is obtained by correcting the first value on the basis of the limit values.

Further, the above embodiments have described as an example the electric brake system using the electric brakes 3 having the motors 10 to produce the brake force. However, the present invention is capable of being applied to other brake control apparatuses. For example, it is possible to apply the foregoing embodiments to a brake control apparatus in which a wheel cylinder hydraulic pressure in which hydraulic pressure is used to generate a pressure in a wheel cylinder and a brake force is produced on the basis of the pressure.

Note that each of the procedures of the flow charts describing the aforementioned procedure corresponds to means for implementing the processing executed in the procedure.

While the above description is of the preferred embodiments of the present invention, it should be appreciated that the invention may be modified, altered, or varied without deviating from the scope and fair meaning of the following claims.

What is claimed is:

1. A brake control apparatus, comprising:
a first target vehicle deceleration operation portion for setting a first target vehicle deceleration determined in accordance with an amount of operation of a brake operating member;
a second target vehicle deceleration operation portion for calculating a second target vehicle deceleration on the basis of said first target vehicle deceleration calculated by said first target vehicle deceleration operation portion; and
an actuator for generating a brake force providing said second target vehicle deceleration calculated by said second target vehicle deceleration operation portion,
wherein said second target vehicle deceleration operation portion sets limit values of a deceleration increasing gradient and a deceleration decreasing gradient with respect to said first target vehicle deceleration on the basis of the first target vehicle deceleration, and obtains said second target vehicle deceleration by correcting said first target vehicle deceleration on the basis of said set deceleration increasing and decreasing gradients.

2. The brake control apparatus according to claim 1, wherein said second target vehicle deceleration operation portion sets said deceleration increasing and decreasing gradients on the basis of a difference between said first target vehicle deceleration and said second target vehicle deceleration.

3. The brake control apparatus according to claim 2, wherein said second target vehicle deceleration operation portion sets said deceleration increasing and decreasing gradients to be larger with increases in an absolute value of the difference between said first target vehicle deceleration and said second target vehicle deceleration.

4. The brake control apparatus according to claim 1, wherein said second target vehicle deceleration operation portion provides feedback on the magnitude of said second target vehicle deceleration to establish said deceleration increasing and decreasing gradients.

5. The brake control apparatus according to claim 2, wherein said second target vehicle deceleration operation portion provides feedback on the magnitude of said second target vehicle deceleration to establish said deceleration increasing and decreasing gradients.

6. The brake control apparatus according to claim 3, wherein said second target vehicle deceleration operation portion provides feedback on the magnitude of said second target vehicle deceleration to establish said deceleration increasing and decreasing gradients.

7. The brake control apparatus according to claim 4, wherein said second target vehicle deceleration operation portion sets said deceleration increasing and decreasing gradients to be larger as said second target vehicle deceleration becomes larger.

8. The brake control apparatus according to claim 5, wherein said second target vehicle deceleration operation portion sets said deceleration increasing and decreasing gradients to be larger as said second target vehicle deceleration becomes larger.

9. The brake control apparatus according to claim 6, wherein said second target vehicle deceleration operation portion sets said deceleration increasing and decreasing gradients to be larger as said second target vehicle deceleration becomes larger.

10. The brake control apparatus according to claim 1, wherein said second target vehicle deceleration operation portion sets said deceleration increasing and decreasing gradients on the basis of a differential value of said first target vehicle deceleration.

11. The brake control apparatus according to claim 2, wherein said second target vehicle deceleration operation portion sets said deceleration increasing and decreasing gradients on the basis of a differential value of said first target vehicle deceleration.

12. The brake control apparatus according to claim 4, wherein said second target vehicle deceleration operation portion sets said deceleration increasing and decreasing gradients on the basis of a differential value of said first target vehicle deceleration.

13. The brake control apparatus according to claim 10, wherein said second target vehicle deceleration operation portion sets said deceleration increasing and decreasing gradients to be larger as an absolute value of the differential value of said first target vehicle deceleration becomes larger.

14. The brake control apparatus according to claim 11, wherein said second target vehicle deceleration operation portion sets said deceleration increasing and decreasing gradients to be larger as an absolute value of the differential value of said first target vehicle deceleration becomes larger.

15. The brake control apparatus according to claim 12, wherein said second target vehicle deceleration operation portion sets said deceleration increasing and decreasing gradients to be larger as an absolute value of the differential value of said first target vehicle deceleration becomes larger.

16. A brake control apparatus, comprising:
  a first value operation portion that converts an amount of operation of a brake operating member to a first value of a parameter corresponding to the amount of operation in order to generate a brake force corresponding to the amount of operation of said brake operating member;
  a second value operation portion that calculates a second value on the basis of said first value calculated by said first value operation portion;
  an actuator that generates the brake force based on said second value calculated by said second value operation portion,
  wherein said second value operation portion sets limit values of a deceleration increasing gradient and a deceleration decreasing gradient for said first value on the basis of the first value, and obtains said second value by correcting said first value on the basis of said set deceleration increasing and decreasing gradients.

17. The brake control apparatus according to claim 16, wherein
  said first value operation portion calculates a first target vehicle deceleration as said first value, and
  said second value operation portion calculates a second target vehicle deceleration as said second value.

18. The brake control apparatus according to claim 16, wherein
  said first value operation portion calculates, as said first value, a first pressurizing force generated by said actuator, and
  said second value operation portion calculates a second pressurizing force as said second value.

* * * * *